(12) United States Patent
Lee et al.

(10) Patent No.: US 10,698,174 B2
(45) Date of Patent: Jun. 30, 2020

(54) CAMERA MODULE AND SENSING UNIT TO DETECT A DETECTION TARGET

(71) Applicant: SAMSUNG ELECTRO-MECHANICS CO., LTD., Suwon-si (KR)

(72) Inventors: Hong Joo Lee, Suwon-si (KR); Nam Ki Park, Suwon-si (KR); Je Hyun Bang, Suwon-si (KR); Young Bok Yoon, Suwon-si (KR); Dong Yeon Shin, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 46 days.

(21) Appl. No.: 15/914,243

(22) Filed: Mar. 7, 2018

(65) Prior Publication Data

US 2018/0299644 A1 Oct. 18, 2018

(30) Foreign Application Priority Data

Apr. 17, 2017 (KR) .......................... 10-2017-0049062

(51) Int. Cl.
*G02B 7/28* (2006.01)
*G03B 13/36* (2006.01)
(Continued)

(52) U.S. Cl.
CPC .............. *G02B 7/28* (2013.01); *G02B 7/021* (2013.01); *G02B 7/08* (2013.01); *G02B 27/646* (2013.01);
(Continued)

(58) Field of Classification Search
CPC . G02B 7/28; G02B 7/021; G02B 7/08; G02B 27/646; G03B 3/10; G03B 13/36;
(Continued)

(56) References Cited

U.S. PATENT DOCUMENTS 6,310,990 B1 10/2001 Putnam et al.
6,571,631 B1 6/2003 Yamamoto
(Continued)

FOREIGN PATENT DOCUMENTS

| CN | 101674030 A | 3/2010 |
|---|---|---|
| CN | 101834984 A | 9/2010 |

(Continued)

OTHER PUBLICATIONS

Korean Office Action dated Apr. 17, 2019 in corresponding Korean Patent Application No. 10-2017-0049062 (6 pages in English and 5 pages in Korean).

(Continued)

*Primary Examiner* — Nicholas G Giles
(74) *Attorney, Agent, or Firm* — NSIP Law

(57) ABSTRACT

A sensing unit of a camera module includes a detection target provided on a side surface of a lens module, one or more sensing coils disposed to face the detection target, and a calculator. The calculator may determine a displacement of the detection target translated in any of an optical axis direction, a first direction perpendicular to the optical axis direction, and a second direction perpendicular to the optical axis direction, based on inductances of the one or more sensing coils.

21 Claims, 6 Drawing Sheets

(51) Int. Cl.
*H02K 41/02* (2006.01)
*G02B 7/08* (2006.01)
*G03B 3/10* (2006.01)
*G02B 27/64* (2006.01)
*G02B 7/02* (2006.01)

(52) U.S. Cl.
CPC .............. *G03B 3/10* (2013.01); *G03B 13/36* (2013.01); *H02K 41/02* (2013.01); *G03B 2205/0007* (2013.01); *G03B 2205/0069* (2013.01)

(58) Field of Classification Search
CPC . H02K 41/02; H04N 5/23258; H04N 5/23251
See application file for complete search history.

(56) References Cited

U.S. PATENT DOCUMENTS

| | | | |
|---|---|---|---|
| 2005/0168584 A1 | 8/2005 | Uenaka | |
| 2009/0153134 A1 | 6/2009 | Matsumoto | |
| 2013/0163085 A1 | 6/2013 | Lim et al. | |
| 2014/0347075 A1 | 11/2014 | Goto et al. | |
| 2016/0344919 A1 | 11/2016 | Cho et al. | |
| 2017/0146889 A1 | 5/2017 | Bang et al. | |
| 2018/0095341 A1 | 4/2018 | Lee et al. | |
| 2018/0299644 A1 | 10/2018 | Lee et al. | |
| 2019/0094565 A1* | 3/2019 | Park | G02B 7/02 |

FOREIGN PATENT DOCUMENTS

| | | |
|---|---|---|
| CN | 103998275 A | 8/2014 |
| CN | 105980922 A | 9/2016 |
| CN | 106170053 A | 11/2016 |
| CN | 106791291 A | 5/2017 |
| CN | 107894645 A | 4/2018 |
| CN | 208174838 U | 11/2018 |
| EP | 2 164 118 A1 | 9/2009 |
| JP | 2001-99608 A | 4/2001 |
| JP | 2005-215454 A | 8/2005 |
| JP | 2009-271204 A | 11/2009 |
| JP | 2012-177754 A | 9/2012 |
| JP | 2014-191092 A | 10/2014 |
| KR | 10-2001-0043340 A | 5/2001 |
| KR | 2002-0088078 A | 11/2002 |
| KR | 10-2008-0060195 A | 7/2008 |
| KR | 10-2013-0072721 A | 7/2013 |
| KR | 10-2013-0077216 A | 7/2013 |
| WO | WO 2015/068061 A2 | 5/2015 |

OTHER PUBLICATIONS

Korean Office Action dated Oct. 15, 2018 in corresponding Korean Patent Application No. 10-2017-0049062 (8 pages in English and 6 pages in Korean).

Chinese Office Action dated Feb. 21, 2020 in counterpart Chinese Patent Application No. 201810343112.5 (12 pages in English and 9 pages in Chinese).

* cited by examiner

US 10,698,174 B2

CAMERA MODULE AND SENSING UNIT TO DETECT A DETECTION TARGET

CROSS-REFERENCE TO RELATED APPLICATIONS

This application claims the benefit under 35 USC 119(a) of Korean Patent Application No. 10-2017-0049062 filed on Apr. 17, 2017 in the Korean Intellectual Property Office, the entire disclosure of which is incorporated herein by reference for all purposes.

BACKGROUND

1. Field

This application relates to a camera module and a sensing unit thereof.

2. Description of Related Art

Recently, portable communications terminals such as cellular phones, personal digital assistants (PDA), portable personal computers (PC), and the like, are generally able to transmit video data, as well as text and audio data. In accordance with this trend, installed camera modules have recently become standard in portable communications terminals in order to enable the transmission of video data, video chatting, and the like.

Generally, a camera module includes a lens barrel having lenses disposed therein, a housing to accommodate the lens barrel therein, and an image sensor to convert an image of a subject into an electrical signal. A single focus type camera module to capture an image of a subject at a fixed focus may be used as the camera module. However, recently, in accordance with the development of technology, a camera module including an actuator enabling autofocusing (AF) has been used. In addition, the camera module may include an actuator for an optical image stabilization (OIS) function to suppress a loss of resolution phenomenon due to handshake.

The above information disclosed in this Background section is only for enhancement of understanding of the background of the disclosure and therefore it may contain information that does not form any part of the prior art nor what the prior art may suggest to a person of ordinary skill in the art.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sensing unit of a camera module includes a detection target disposed on a side surface of a lens module; one or more sensing coils disposed to face the detection target; and a calculator configured to determine a displacement of the detection target translated in any of an optical axis direction, a first direction perpendicular to the optical axis direction, and a second direction perpendicular to the optical axis direction, based on inductances of the one or more sensing coils.

The inductances of the one or more sensing coils may be changed depending on the movement of the detection target.

The one or more sensing coils may include a first sensing coil and a second sensing coil disposed in the first direction.

The calculator may be further configured to perform subtraction between inductances of the first sensing coil and the second sensing coil to determine a displacement of the detection target in the first direction.

The calculator may be further configured to perform addition between the inductances of the first sensing coil and the second sensing coil to determine a displacement of the detection target in the second direction.

The calculator may be further configured to divide a value generated by performing the subtraction by a value generated by performing the addition to determine the displacement of the detection target in the first direction.

The one or more sensing coils may further include a third sensing coil disposed in the optical axis direction together with at least one of the first sensing coil and the second sensing coil.

The calculator may be further configured to determine a displacement of the detection target in the optical axis direction based on a subtraction between inductances of at least one of the first sensing coil and the second sensing coil and a third inductance of the third sensing coil.

The calculator may be further configured to determine a displacement of the detection target in the second direction based on addition among the inductances of the first sensing coil, the second sensing coil, and the third sensing coil.

The calculator may be further configured to determine a displacement of the detection target in the first direction based on a value generated by performing the subtraction divided by a value generated by performing the addition.

In another general aspect, a camera module includes a lens module having an optical axis direction; an actuator unit configured to provide a driving force in the optical axis direction and a direction perpendicular to the optical axis direction; and a sensing unit including one or more sensing coils disposed to face a side surface of the lens module and configured to determine a displacement of the lens module in any of the optical axis direction, and the direction perpendicular to the optical axis direction.

The sensing unit may further include a detection target disposed on the side surface of the lens module, wherein an inductance of the sensing coils is changed as a result of movement of the detection target.

The sensing unit may be configured to determine a displacement of the lens module in the direction perpendicular to the optical axis direction based on subtraction between inductances of the one or more sensing coils.

The sensing unit may be configured to perform the subtraction between the inductances of the one or more sensing coils to remove changes in the inductances due to a displacement of the lens module in a direction perpendicular to a surface on which the one or more sensing coils are disposed.

The sensing unit may be configured to perform addition between inductances of the one or more sensing coils to determine a displacement of the lens module in a direction perpendicular to a surface on which the one or more sensing coils are disposed.

The sensing unit may be configured to perform the addition between the inductances of the one or more sensing coils to remove changes in the inductances due to a displacement of the lens module in the direction perpendicular to the optical axis.

In another general aspect, a sensing unit of a camera module, includes a detection target disposed on a lens module; sensing coils disposed to face the detection target;

and a calculator. The calculator is configured to receive an inductance of each of the sensing coils and determine a displacement of the detection target translated in any of an optical axis direction of the lens module, a first direction perpendicular to the optical axis direction, and a second direction perpendicular to the optical axis direction different from the first direction, based on the received inductances of the sensing coils.

The sensing coils may be disposed in the first direction, the calculator may be further configured to determine a displacement of the detection target in the first direction by subtracting the inductances of the sensing coils from one another, the calculator may be further configured to determine a displacement of the detection target in the second direction by adding the inductances of the sensing coils to one another, and the second direction may be perpendicular to the first direction.

The sensing coils may further be disposed in the optical axis direction, and the calculator may be further configured to determine a displacement of the detection target in the optical axis direction by subtracting the inductances of the sensing coils from one another.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

An aspect of the present disclosure may provide a camera module capable of precisely detecting a position of a lens module without using a hall sensor, and a sensing unit thereof.

According to an aspect of the present disclosure, a sensing unit of a camera module may include a detection target provided on a side surface of a lens module, a plurality of sensing coils disposed to face the detection target, and a calculator. The calculator may be configured to receive an inductance of each of the plurality of sensing coils and determine a displacement of the detection target translated in an optical axis direction, a first direction perpendicular to the optical axis direction, and a second direction perpendicular to the optical axis direction different from the first direction, based on the received inductance of the plurality of sensing coils.

Figure 1:
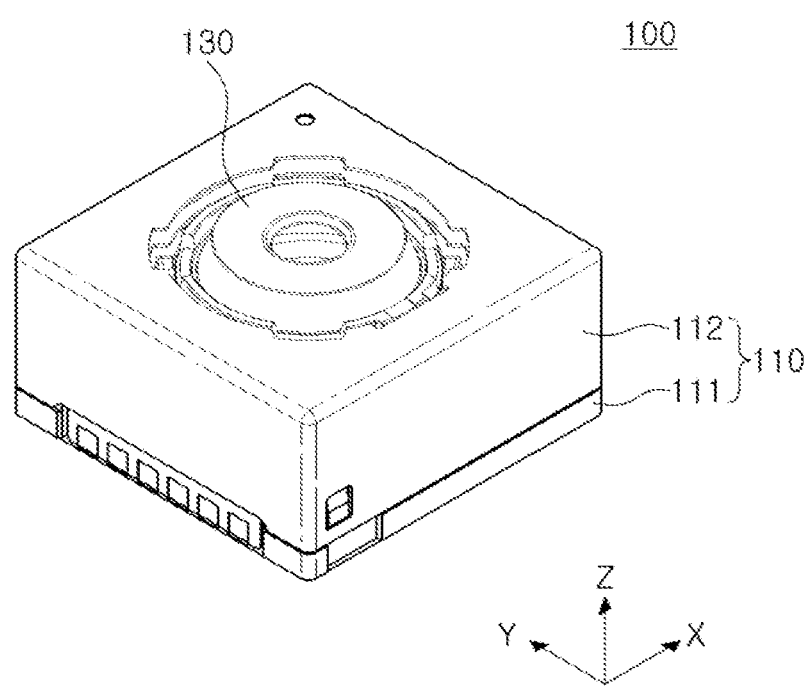
FIG. 1 is an assembled perspective view illustrating a camera module according to an exemplary embodiment of the disclosure.

FIG. 1 is an assembled perspective view illustrating a camera module according to an exemplary embodiment of the disclosure.

The camera module 100 may include a housing unit 110 and a lens module 130, and the housing unit 110 may include a housing 111 and a shielding case 112. The camera module 100 may include at least one of an autofocusing unit to perform an autofocusing function and an optical image stabilization unit to perform an optical image stabilization function. As an example, in order for the camera module 100 to perform the autofocusing function and the optical image stabilization function, the lens module 130 may move in an optical axis direction and a direction perpendicular to the optical axis direction in the housing unit 110.

Figure 2:
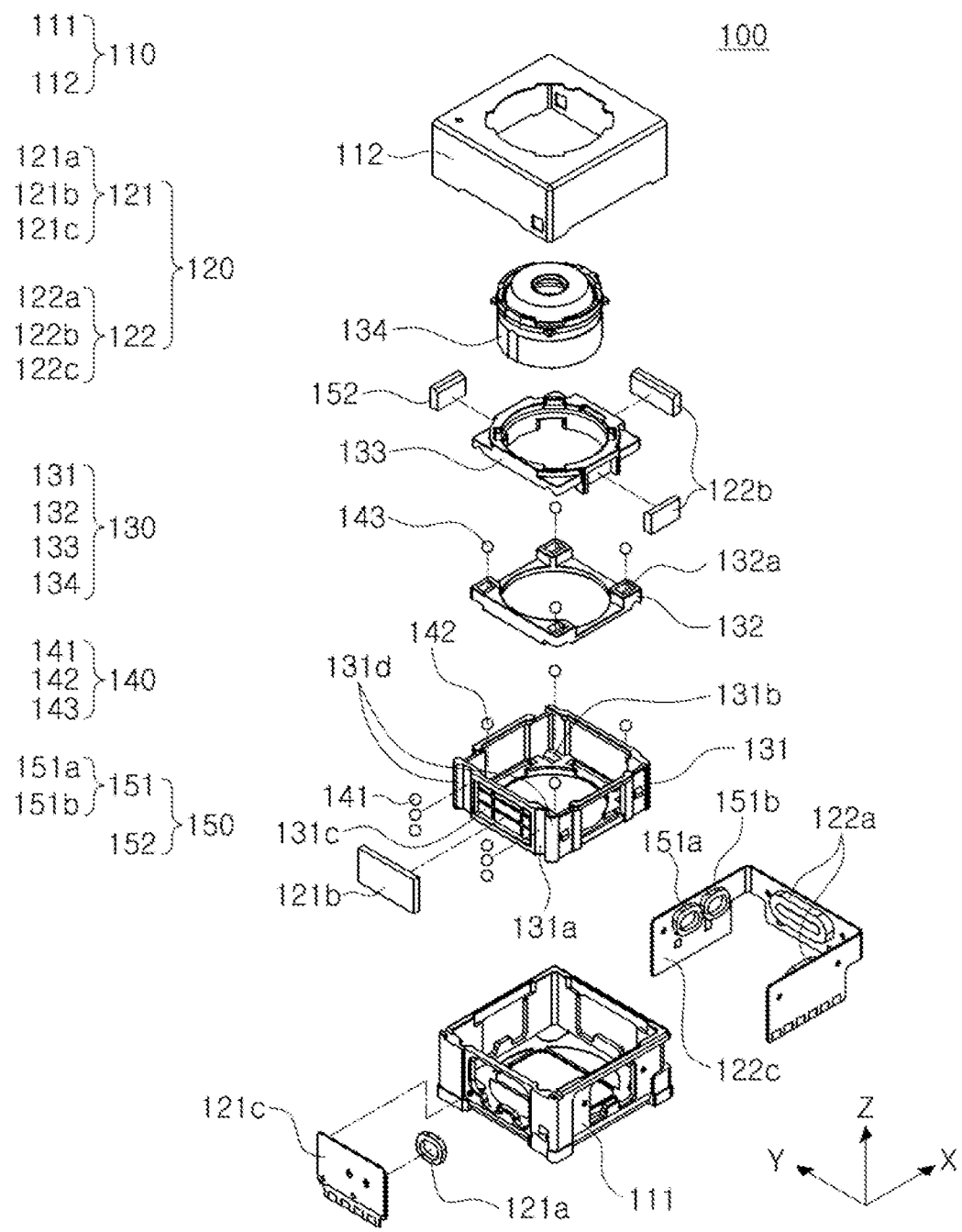
FIG. 2 is an exploded perspective view illustrating the camera module according to an exemplary embodiment of the disclosure.

FIG. 2 is an exploded perspective view illustrating the camera module according to an exemplary embodiment of the disclosure.

Referring to FIG. 2, the camera module 100 may include the housing unit 110, an actuator unit 120, and the lens module 130.

The housing unit 110 may include the housing 111 and the shielding case 112. The housing 111 may be formed of a molded rigid material. For example, the housing 111 may be formed of plastic, aluminum alloy, magnesium alloy, stainless steel, composite, and the like, or combinations thereof. The actuator unit 120 and the sensing unit 150 may be mounted in the housing 111. As an example, some components of a first actuator 121 may be mounted on a first side surface of the housing 111, some components of a second actuator 122 may be mounted on second and third side surfaces of the housing 111, and some components of the sensing unit 150 may be mounted on a fourth side surface of the housing 111.

The housing 111 may be configured to accommodate the lens module 130 therein. As an example, a space in which the lens module 130 may be completely or partially accommodated may be formed in the housing 111.

Six surfaces of the housing 111 may be open. As an example, a hole in which an image sensor is to be mounted may be formed in a bottom surface of the housing 111, and a hole in which the lens module 130 is to be mounted may be formed in a top surface of the housing 111. In addition, a hole into which a first driving coil 121a of the first actuator 121 may be inserted may be formed in the first side surface of the housing 111, holes into which second driving coils 122a of the second actuator 122 may be inserted may be formed in the second and third side surfaces of the housing 111. In addition, a hole into which a sensing coil 151 of the sensing unit 150 may be inserted may be formed in the fourth side surface of the housing 111.

The shielding case 112 may be configured to cover portions of the housing 111. As an example, the shielding case 112 may be configured to cover the top surface and four side surfaces of the housing 111. Alternatively, the shielding case 112 may be configured to only cover the four side surfaces of the housing 111 or may be configured to partially cover the top surface and the four side surfaces of the housing 111.

The actuator unit 120 may include a plurality of actuators. As an example, the actuator unit 120 may include the first actuator 121 configured to move the lens module 130 in a Z-axis direction and the second actuator 122 configured to move the lens module 130 in an X-axis direction and a Y-axis direction.

The first actuator 121 may be mounted on the housing 111 and a first frame 131 of the lens module 130. As an example, some components of the first actuator 121 may be mounted on the first side surface of the housing 111, and the others of the components of the first actuator 121 may be mounted on a first side surface of the first frame 131. The first actuator 121 may move the lens module 130 in the optical axis direction (the Z-axis direction of FIG. 2). As an example, the first actuator 121 may include the first driving coil 121a, a first driving magnet 121b, and a first substrate 121c. The first driving coil 121a may be formed on the first substrate 121c. The first substrate 121c may be mounted on the first side surface of the housing 111, and the first driving magnet 121b may be mounted on the first side surface of the first frame 131 facing the first substrate 121c.

The first actuator 121 may apply a driving signal to the first driving coil 121a. The first actuator 121 may include an H-bridge circuit that may be bi-directionally driven to apply the driving signal to the first driving coil 121a in a voice coil motor manner. When the driving signal is applied to the first driving coil 121a, magnetic flux may be generated by the first driving coil 121a, and may interact with a magnetic field of the first driving magnet 121b to generate driving force enabling relative movement of the first frame 131 and a lens barrel 134 with respect to the housing 111. The first actuator 121 may determine displacements of the lens barrel 134 and the first frame 131 from changes in inductance of one or more sensing coils 151 of the sensing unit 150. The first driving magnet 121b may be disposed on one surface 131c of the first frame 131, as illustrated in FIG. 2, or be disposed on one of corners 131d of the first frame 131.

The second actuator 122 may be mounted on the housing 111 and a third frame 133 of the lens module 130. As an example, some components of the second actuator 122 may be mounted on the second and third side surfaces of the housing 111, and the others of the components of the second actuator 122 may be mounted on second and third side surfaces of the third frame 133. Alternatively, the second actuator 122 may be mounted on some of corners of the housing 111 and the third frame 133.

The second actuator 122 may move the lens module 130 in the direction perpendicular to the optical axis direction. As an example, the second actuator 122 may include the second driving coils 122a, second driving magnets 122b, and a second substrate 122c. The second driving coil 122a may be formed on the second substrate 122c. The second substrate 122c may have a generally '⊏' shape, and be mounted to surround the second to fourth side surfaces of the housing 111. The second driving magnets 122b may be mounted on the second and third side surfaces of the third frame 133 to face the second driving coils 122a disposed on the second substrate 122c.

The second actuator 122 may change a magnitude and a direction of magnetic force generated between the second driving coils 122a and the second driving magnets 122b to enable relative movement of a second frame 132 or the third frame 133 with respect to the first frame 131. The lens barrel 134 may move in the same direction as a moving direction of the second frame 132 or the third frame 133 by the movement of the second frame 132 or the third frame 133.

The second actuator 122 may detect a position of the second frame 132 or the third frame 133 from changes in inductance of one or more sensing coils 151 of the sensing unit 150.

The lens module 130 may be mounted in the housing unit 110. As an example, the lens module 130 may be accommodated in an accommodation space formed by the housing 111 and the shielding case 112 to be movable in at least three axis directions.

The lens module 130 may include a plurality of frames. As an example, the lens module 130 may include the first frame 131, the second frame 132, and the third frame 133. The first frame 131 may be movable with respect to the housing 111. As an example, the first frame 131 may move in the optical axis direction (the Z-axis direction) by the first actuator 121 described above. A plurality of guide grooves 131a and 131b may be formed in the first frame 131. As an example, a first guide groove 131a extended to be elongated in the optical axis direction (the Z-axis direction) may be formed in the first side surface of the first frame 131, and second guide grooves 131b extended to be elongated in a first direction (the Y-axis direction) perpendicular to the optical axis direction may be formed in four corners of an inner bottom surface of the first frame 131, respectively. The first frame 131 may be manufactured so that at least three side surfaces thereof are open. As an example, second and third side surfaces of the first frame 131 may be open so that the second driving magnets 122b of the third frame 133 and the second driving coils 122a of the housing 111 may face each other, and a fourth side surface of the first frame 131 may be open so that a detection target 152 of the third frame 133 and the sensing coil 151 of the housing 111 may face each other. The detection target 152 herein refers to a unit to be detected.

The second frame 132 may be mounted in the first frame 131. As an example, the second frame 132 may be mounted in an internal space of the first frame 131. The second frame 132 may move in the first direction (the Y-axis direction) perpendicular to the optical axis direction with respect to the first frame 131. As an example, the second frame 132 may move in the first direction (the Y-axis direction) perpendicular to the optical axis direction along the second guide grooves 131b of the first frame 131. A plurality of guide grooves 132a may be formed in the second frame 132. As an example, four third guide grooves 132a extended to be elongated in a second direction (the X-axis direction) perpendicular to the optical axis direction may be formed in corners of the second frame 132, respectively.

The third frame 133 may be mounted on the second frame 132. As an example, the third frame 133 may be mounted on a top surface of the second frame 132. The third frame 133 may be configured to move in the second direction (the X-axis direction) perpendicular to the optical axis direction with respect to the second frame 132. As an example, the third frame 133 may move in the second direction (the X-axis direction) perpendicular to the optical axis direction along the third guide grooves 132*a* of the second frame 132. The third frame 133 may be mounted with a plurality of second driving magnets 122*b* and the detection target 152. As an example, at least two second driving magnets 122*b* may be formed on the second and third side surfaces of the third frame 133, respectively, and the detection target 152 may be mounted on a fourth side surface of the third frame 133.

Meanwhile, the third frame 133 described above may be formed integrally with the second frame 132. In this case, the integrally formed third frame 133 and second frame 132 may move in the first direction (the Y-axis direction) and the second direction (the X-axis direction) perpendicular to the optical axis direction. In this case, second guide groove 131*b* and third guide groove 132*a* may be formed in the first frame 131.

The lens module 130 may include the lens barrel 134. As an example, the lens module 130 may include the lens barrel 134 including one or more lenses. The lens barrel 134 may have a hollow cylindrical shape so that a plurality of lenses to capture an image of a subject may be accommodated therein, and the plurality of lenses may be disposed in the lens barrel 134 in the optical axis direction. The number of lenses stacked in the lens barrel 134 may depend on a design of the lens barrel 134, and these lenses may have optical characteristics such as the same refractive index or different refractive indices, or the like.

The lens barrel 134 may be mounted in the third frame 133. As an example, the lens barrel 134 may be fitted into the third frame 133 to thus move integrally with the third frame 133. The lens barrel 134 may move in the optical axis direction (the Z-axis direction) and the directions (the X-axis and Y-axis directions) perpendicular to the optical axis direction. As an example, the lens barrel 134 may move in the optical axis direction (the Z-axis direction) by the first actuator 121, and move in the directions (the X-axis and Y-axis directions) perpendicular to the optical axis direction by the second actuator 122. Alternatively, the lens barrel 134 may be formed integrally with the third frame 133.

A ball bearing unit 140 may guide the movement of the lens module 130. As an example, the ball bearing unit 140 may be configured so that the lens module 130 smoothly moves in the optical axis direction and the directions perpendicular to the optical axis direction. The ball bearing unit 140 may include first ball bearings 141, second ball bearings 142, and third ball bearings 143. As an example, the first ball bearings 141 may be disposed in the first guide groove 131*a* of the first frame 131 to allow the first frame 131 to move smoothly in the optical axis direction. As another example, the second ball bearings 142 may be disposed in the second guide grooves 131*b* of the first frame 131 to allow the second frame 132 to move smoothly in the first direction perpendicular to the optical axis direction. As another example, the third ball bearings 143 may be disposed in the third guide grooves 132*a* of the second frame 132 to allow the third frame 133 to move smoothly in the second direction perpendicular to the optical axis direction.

Each of the first and second ball bearings 141 and 142 may include at least three balls, and at least three balls of each of the first and second ball bearings 141 and 142 may be disposed in the first or second guide grooves 131*a* or 131*b*, respectively.

A lubricating material for reducing friction and noise may be filled in all the portions in which the ball bearing unit 140 is disposed. As an example, a viscous fluid may be injected into the respective guide grooves 131*a*, 131*b*, and 132*a*. As the viscous fluid, grease having good viscosity and lubricating characteristics may be used.

The sensing unit 150 may include one or more sensing coils 151 and the detection target 152. One or more sensing coils 151 may include a first sensing coil 151*a* and a second sensing coil 151*b*, and the first sensing coil 151*a* and the second sensing coil 151*b* may be formed on the second substrate 122*c* and be mounted on the fourth side surface of the housing 111. The detection target 152 may be mounted on the fourth side surface of the third frame 133 to face the first sensing coil 151*a* and the second sensing coil 151*b* formed on the second substrate 122*c*. The detection target 152 may include any of a magnetic body and a conductor, or both. For example, the detection target 152 may be implemented by any of rare earth, iron, copper, gold, silver, nickel, aluminum, and alloys thereof, stainless steel (SUS), magnetic or conductive polymers, magnetic or conductive ceramics, composites, and the like, or combinations thereof.

The sensing unit 150 may detect a position of the detection target 152 to determine a displacement of the lens module 130, more specifically, a displacement of the lens barrel 134.

The sensing unit 150 may determine a displacement of the detection target 152 from a change in an inductance of the sensing coil 151. As an example, the sensing unit 150 may perform subtraction between inductances of the first sensing coil 151*a* and the second sensing coil 151*b* to determine the displacement of the detection target 152 in a direction in which the first sensing coil 151*a* and the second sensing coil 151*b* are disposed. For example, the sensing unit 150 may perform subtraction between inductances of the first sensing coil 151*a* and the second sensing coil 151*b* to determine the displacement of the detection target 152 in the X-axis direction when the first sensing coil 151*a* and the second sensing coil 151*b* are disposed in the X-axis direction as shown in FIG. 2. Alternatively, the sensing unit 150 may perform addition between inductances of the first sensing coil 151*a* and the second sensing coil 151*b* to determine the displacement of the detection target 152 in a direction perpendicular to a surface on which the first sensing coil 151*a* and the second sensing coil 151*b* are disposed. For example, the sensing unit 150 may perform addition between inductances of the first sensing coil 151*a* and the second sensing coil 151*b* to determine the displacement of the detection target 152 in the Y-axis direction in FIG. 2.

Figure 3:
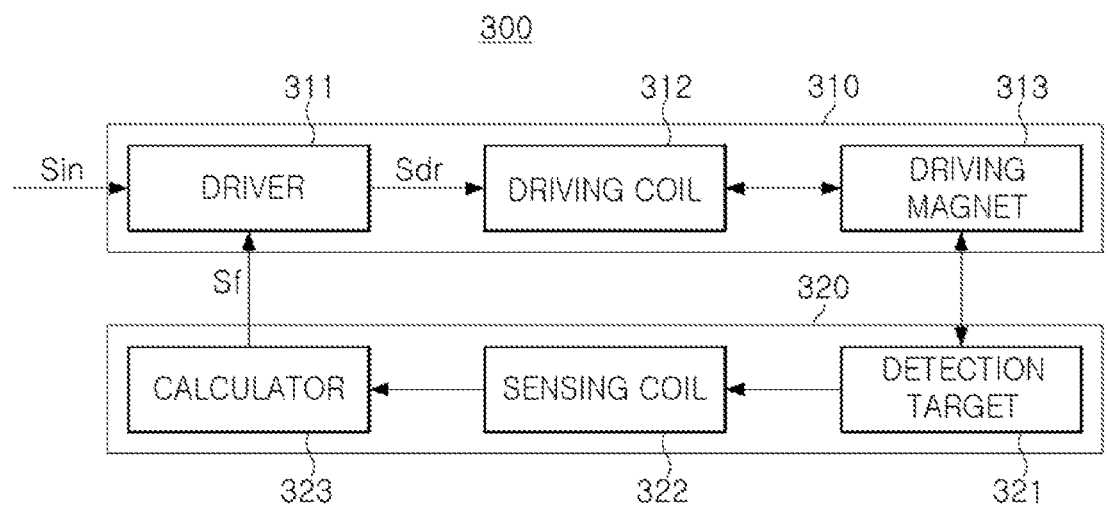
FIG. 3 is a block diagram illustrating an actuator unit and a sensing unit used in the camera module according to an exemplary embodiment of the disclosure.

FIG. 3 is a block diagram illustrating an actuator unit and a sensing unit used in the camera module according to an exemplary embodiment of the disclosure.

The actuator 310 of FIG. 3 may correspond to the first actuator 121 and the second actuator 122 of the actuator unit 120 of FIG. 2. When the actuator 310 of FIG. 3 corresponds to the first actuator 121 of FIG. 2, the actuator 310 may move the lens barrel in the optical axis direction in order to perform an autofocusing (AF) function of the camera module. Therefore, when the actuator 310 of FIG. 3 performs the autofocusing function, a driver 311 to be described below may apply a driving signal Sdr to a driving coil 312 to provide driving force in the optical axis direction to a driving magnet 313.

In addition, when the actuator 310 of FIG. 3 corresponds to the second actuator 122 of FIG. 2, the actuator 310 may move the lens barrel in the directions perpendicular to the optical axis direction to perform an optical image stabilization (OIS) function of the camera module. Therefore, when the actuator 310 of FIG. 3 performs the optical image stabilization function, a driver 311 to be described below may apply a driving signal to a driving coil 312 to provide driving force in the directions perpendicular to the optical axis direction to a driving magnet 313.

The actuator 310 may include the driver 311, the driving coil 312, and the driving magnet 313.

The driver 311 may receive an input signal Sin applied from an external source and the feedback signal Sf generated by a sensing unit 320, and may provide a driving signal Sdr to the driving coil 312. The driver 311 may include a driver integrated circuit (IC) providing the driving signal Sdr to the driving coil 312. The driving IC may include an H-bridge circuit that may be bidirectionally driven to apply the driving signal Sdr to the driving coil 312 in a voice coil motor manner.

When the driving signal Sdr is applied from the driver 311 to the driving coil 312, the driving magnet 313 may receive the driving force and the lens module may move in the optical axis direction or the directions perpendicular to the optical axis direction, by electromagnetic interaction between the driving coil 312 and the driving magnet 313.

When the lens module moves by the electromagnetic interaction between the driving magnet 313 and the driving coil 312, the sensing unit 320 may calculate a position of a detection target 321 moving together with the lens module to generate the feedback signal Sf, and provide the feedback signal Sf to the driver 311.

When the detection target 321 provided on a side surface of the lens module moves by driving force provided from the driver 311, areas of the detection target 321 overlapping one or more sensing coils 322 may be changed, and inductances of the one or more sensing coils 322 may thus be changed. That is, the inductances of the one or more coils 322 may be changed depending on the movement of the detection target 321.

The sensing unit 320 may include the detection target 321, one or more sensing coils 322, and a calculator 323. Here, the detection target 321 may correspond to detection target 152 included in the sensing unit 150 of FIG. 2, and the one or more sensing coils 322 may correspond to the one or more sensing coils 151a and 151b included in the sensing unit 150 of FIG. 2.

The calculator 323 may perform subtraction between inductances of one or more sensing coils 322 to determine a displacement of the detection target 321 in a direction in which the one or more sensing coils 322 are disposed. For example, the calculator 323 may perform a subtraction of a first inductance in a first sensing coil of the one or more sensing coils 322 at a first position of the detection target 321 from a second inductance in that first sensing coil at a second position spaced apart from the first position to determine the displacement of the detection target 321. For another example, the calculator 323 may perform a subtraction of the first inductance in the first sensing coil from a third inductance in a second sensing coil of the one or more sensing coils 322 to determine a displacement or position of the detection target 321 in the direction in which the one or more sensing coils 322 are disposed. In addition, the calculator 323 may perform addition between inductances of the one or more sensing coils 322 to determine a displacement of the detection target 321 in a direction perpendicular to a surface on which the one or more sensing coils 322 are disposed. For example, the calculator 323 may perform an addition of the first inductance in the first sensing coil at the first position of the detection target 321 to the second inductance in the first sensing coil at the second position spaced apart from the first position to determine the displacement of the detection target 321. For another example, the calculator 323 may perform an addition of the first inductance in the first sensing coil to the third inductance in the second sensing coil to determine a displacement or position of the detection target 321 in the direction perpendicular to the surface on which the one or more sensing coils 322 are disposed.

The calculator 323 may include a memory, and position information of the detection target 321 corresponding to a calculated inductance may be stored in the memory. The memory may be implemented by a non-volatile memory including one of a flash memory, an electrically erasable programmable read-only memory (EEPROM), and a ferroelectric random access memory (FeRAM).

The calculator 323 may determine a position of the detection target 321 depending on the calculated inductance, and generate the feedback signal Sf corresponding to the determined position. When the feedback signal Sf is provided to the driver 311, the driver 311 may compare the input signal Sin and the feedback signal Sf with each other to again generate the driving signal Sdr based on the comparison. That is, the driver 311 may be driven in a closed-loop type of control comparing the input signal Sin and the feedback signal Sf with each other. The closed-loop type driver 311 may be driven to reduce an error between a target position included in the input signal Sin and a present position included in the feedback signal Sf. The closed-loop type of control driving may have linearity, accuracy, and repeatability improved as compared to an open-loop type control.

The one or more sensing coils of the sensing unit 150 according to the exemplary embodiment of the disclosure may be disposed in a first direction. The sensing unit 150 may perform subtraction between inductances of the one or more sensing coils disposed in the first direction to determine a position of the detection target in the first direction. The sensing unit 150 may perform the subtraction between the inductances of the one or more sensing coils disposed in the first direction to remove changes in the inductances of the sensing coils depending on distances between the sensing coils and the detection target in a second direction perpendicular to a surface on which the sensing coils are disposed.

In addition, the sensing unit 150 according to the exemplary embodiment of the disclosure may perform addition between inductances of the one or more sensing coils disposed in the first direction to determine a position of the detection target in the second direction perpendicular to the surface on which the sensing coils are disposed.

An operation of calculating a position by the sensing unit according to the exemplary embodiment of the disclosure will hereinafter be described with reference to FIGS. 4 through 6D.

Figure 4:
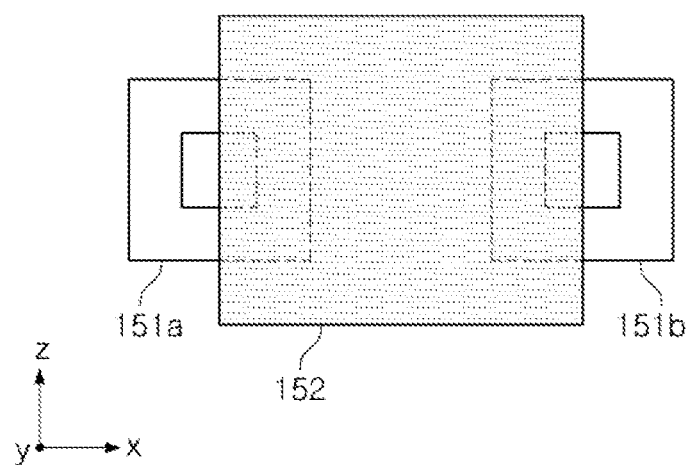
FIG. 4 is a view illustrating a layout of sensing coils and a detection target according to the exemplary embodiment of FIG. 2.

FIG. 4 is a view illustrating a layout of one or more sensing coils and a detection target according to the exemplary embodiment of FIG. 2, and FIGS. 5A through 6D are graphs illustrating changes in inductance of the sensing coils and calculation results for positions of the detection target according to the exemplary embodiment of FIG. 4.

Referring to FIG. 4, the first sensing coil 151a and the second sensing coil 151b of the one or more sensing coils may be disposed in the X-axis direction, that is, along the X-axis direction, and the detection target 152 may move in the X-axis direction, the Y-axis direction, and the Z-axis direction.

When the detection target 152 moves in the X-axis direction, overlapping areas between the detection target 152 and the first sensing coil 151*a* and between the detection target 152 and the second sensing coil 151*b* may be increased or decreased in different directions. For example, when the detection target 152 moves in the X-axis direction, an inductance of the first sensing coil 151*a* may be decreased, and an inductance of the second sensing coil 151*b* may be increased.

In addition, when the detection target 152 moves in the Y-axis direction, overlapping areas between the detection target 152 and the first and second sensing coils 151*a* and 151*b* may not change; however, a distance in the Y-axis direction between the detection target 152 and the first and second sensing coils 151*a* and 151*b* may be increased or decreased in the same direction. For example, when the detection target 152 moves in the Y-axis direction, inductances of the first sensing coil 151*a* and the second sensing coil 151*b* may be increased or decreased in the same direction.

Figure 5A:
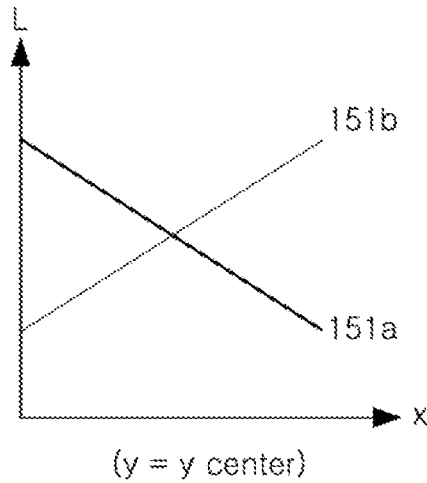
FIGS. 5A through 6D are graphs illustrating changes in inductance of the sensing coils and calculation results of positions of the detection target according to the exemplary embodiment of FIG. 4.
Figure 5B:
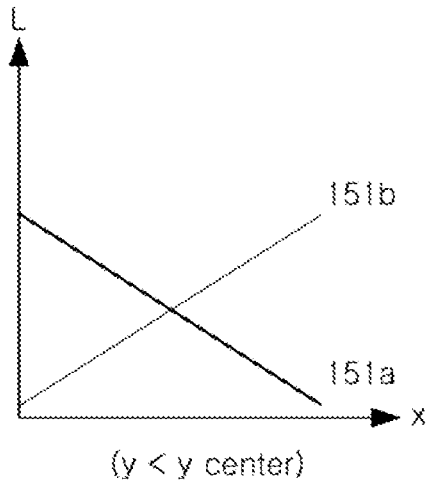
Figure 5C:
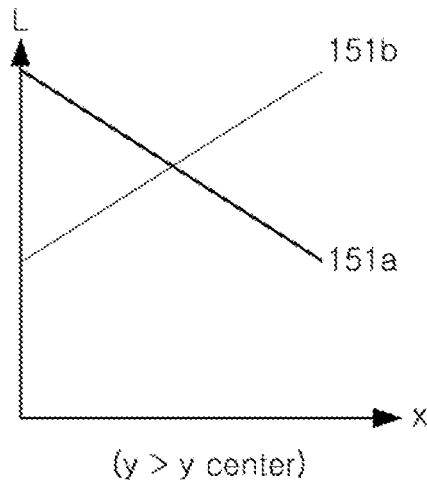
Figure 5D:
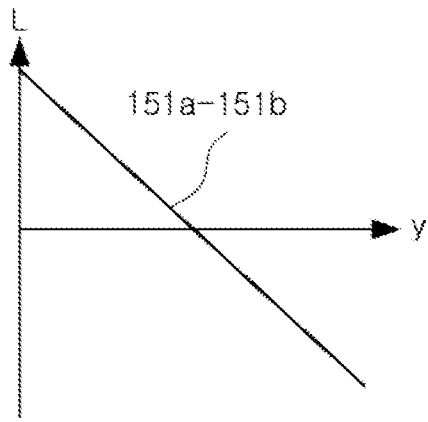

FIG. 5A is a graph illustrating changes in inductances of the sensing coils 151*a*, 151*b* in an example case in which the detection target 152 moves in the X-axis direction at the center in the Y-axis direction. FIG. 5B is a graph illustrating changes in inductances of the sensing coils 151*a*, 151*b* in an example case in which the detection target 152 moves in the X-axis direction in a position spaced farther apart from the sensing coils 151*a*, 151*b* as compared to the center in the Y-axis direction of FIG. 5A (y<y-center since the positive Y-axis direction is into the page). FIG. 5C is a graph illustrating changes in inductances of the sensing coils 151*a*, 151*b* in an example case in which the detection target 152 moves in the X-axis direction in a position closer to the sensing coils 151*a*, 151*b* as compared to the center in the Y-axis direction of FIG. 5A (y>y-center). In addition, FIG. 5D is a graph illustrating a result obtained by performing subtraction between inductances of the sensing coils 151*a*, 151*b* of FIGS. 5A through 5C.

Referring to FIGS. 5A through 5C, when the detection target 152 moves in the X-axis direction, an inductance of the first sensing coil 151*a* may be decreased, and an inductance of the second sensing coil 151*b* may be increased.

However, an inductance of the first sensing coil 151*a* and an inductance of the second coil 151*b* may be decreased or increased in a state in which the inductances are decreased by a reference level in the example case (see FIG. 5B) in which the detection target 152 moves in the X-axis direction at the position spaced farther apart from the sensing coils 151*a*, 151*b* as compared to the center in the Y-axis direction (see FIG. 5A) in which the detection target 152 moves in the X-axis direction at the center in the Y-axis direction. The reference level may be determined depending on a distance difference of the detection target 152 in the Y-axis direction in each of FIGS. 5A and 5B.

In addition, an inductance of the first sensing coil 151*a* and an inductance of the second coil 151*b* may be decreased or increased in a state in which they are increased by a reference level, in the case (see FIG. 5C) in which the detection target 152 moves in the X-axis direction at the position closer to the sensing coils 151*a*, 151*b* as compared to the center in the Y-axis direction (see FIG. 5A) in which the detection target 152 moves in the X-axis direction at the center in the Y-axis direction. The reference level may be determined depending on a distance difference of the detection target 152 in the Y-axis direction in each of FIGS. 5A and 5C.

Referring to the changes in the inductances of the sensing coils 151*a*, 151*b* of FIGS. 5A through 5C, when the detection target 152 moves in the X-axis direction, the inductance of the first sensing coil 151*a* may be decreased and the inductance of the second sensing coil 151*b* may be increased, in every case.

Therefore, the sensing unit 150 according to the exemplary embodiment of the disclosure may perform the subtraction between the inductances of the first sensing coil 151*a* and the second sensing coil 151*b* disposed in the X-axis direction to remove changes in the inductance of the first sensing coil 151*a* and the second sensing coil 151*b* depending on a position of the detection target 152 in the Y-axis direction. Therefore, the sensing unit 150 may precisely determine a position of the detection target 152 in the X-axis direction.

Further, the sensing unit 150 according to the exemplary embodiment of the disclosure may divide a value generated by performing the subtraction between the inductances of the first sensing coil 151*a* and the second sensing coil 151*b* by a value generated by performing the addition between the inductances of the first sensing coil 151*a* and the second sensing coil 151*b* to more precisely determine the position of the detection target 152 in the X-axis direction. Here, the value generated by performing the addition between the inductances of the first sensing coil 151*a* and the second sensing coil 151*b* may correspond to a value for determining the position of the detection target in the Y-axis direction, as described below.

Figure 6A:
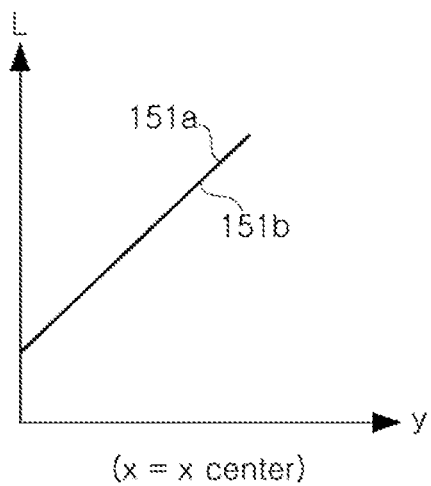
Figure 6B:
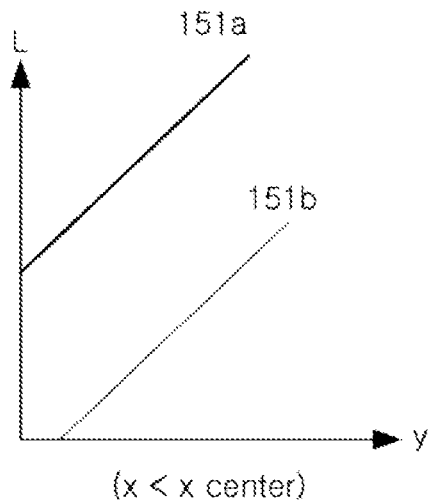
Figure 6C:
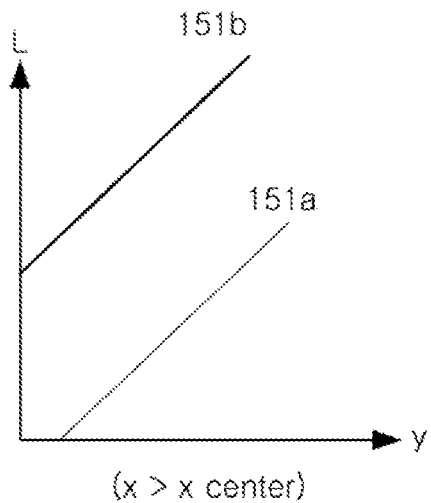
Figure 6D:
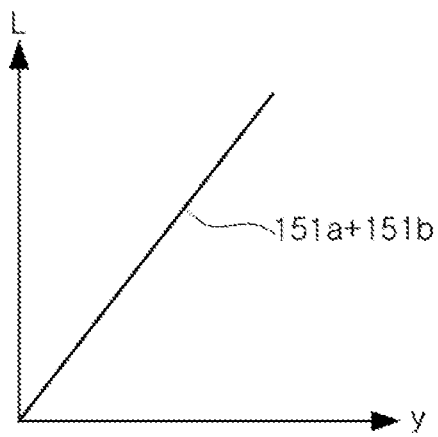

FIG. 6A is a graph illustrating changes in inductance of the sensing coils 151*a*, 151*b* in a case in which the detection target 152 moves in the Y-axis direction at the center in the X-axis direction, FIG. 6B is a graph illustrating changes in inductance of the sensing coils 151*a*, 151*b* in a case in which the detection target 152 moves in the Y-axis direction in a position adjacent to the first sensing coil 151*a* as compared to the center in the X-axis direction, and FIG. 6C is a graph illustrating changes in inductance of the sensing coils 151*a*, 151*b* in a case in which the detection target 152 moves in the Y-axis direction in a position adjacent to the second sensing coil 151*b* as compared to the center in the X-axis direction. In addition, FIG. 6D is a graph illustrating a result obtained by performing addition between inductances of the sensing coils 151*a*, 151*b* of FIGS. 6A through 6C.

Referring to FIGS. 6A through 6C, when the detection target 152 moves in the Y-axis direction, inductances of the first sensing coil 151*a* and the second sensing coil 151*b* may be increased.

In the case (see FIG. 6A) in which the detection target 152 moves in the Y-axis direction at the center in the X-axis direction, inductances of the first sensing coil 151*a* and the second sensing coil 151*b* may have the same level. However, in the case (see FIG. 6B) in which the detection target 152 moves in the Y-axis direction at the position adjacent to the first sensing coil 151*a* as compared to the center in the X-axis direction, an inductance of the first sensing coil 151*a* may be increased in a state in which it is increased as compared to an inductance of the second sensing coil 151*b* by a reference level. The reference level may be determined depending on a distance difference of the detection target 152 in the X-axis direction in each of FIGS. 6A and 6B.

In addition, in the case (see FIG. 6C) in which the detection target 152 moves in the Y-axis direction at the position adjacent to the second sensing coil 151*b* as compared to the center in the X-axis direction, an inductance of the second sensing coil 151b may be increased in a state in which it is increased as compared to an inductance of the first sensing coil 151a by a reference level. The reference level may be determined depending on a distance difference of the detection target 152 in the X-axis direction in each of FIGS. 6A and 6C.

Referring to the changes in the inductances of the sensing coils 151a, 151b of FIGS. 6A through 6C, when the detection target 152 moves in the Y-axis direction, the inductances of the first sensing coil 151a and the second sensing coil 151b may be increased, in every case.

Therefore, the sensing unit 150 according to the exemplary embodiment of the disclosure may perform addition between the inductances of the first sensing coil 151a and the second sensing coil 151b disposed in the X-axis direction to determine a position of the detection target 152 in the Y-axis direction.

The sensing unit 150 according to the exemplary embodiment of the disclosure may determine the position of the detection target 152 in the X-axis direction and the Y-axis direction in the manner described above, and may also determine a position of the detection target 152 in the Z-axis direction in a similar manner. In this case, an additional sensing coil for determining the position of the detection target 152 in the Z-axis direction may be provided.

Figures 7A, 7B:
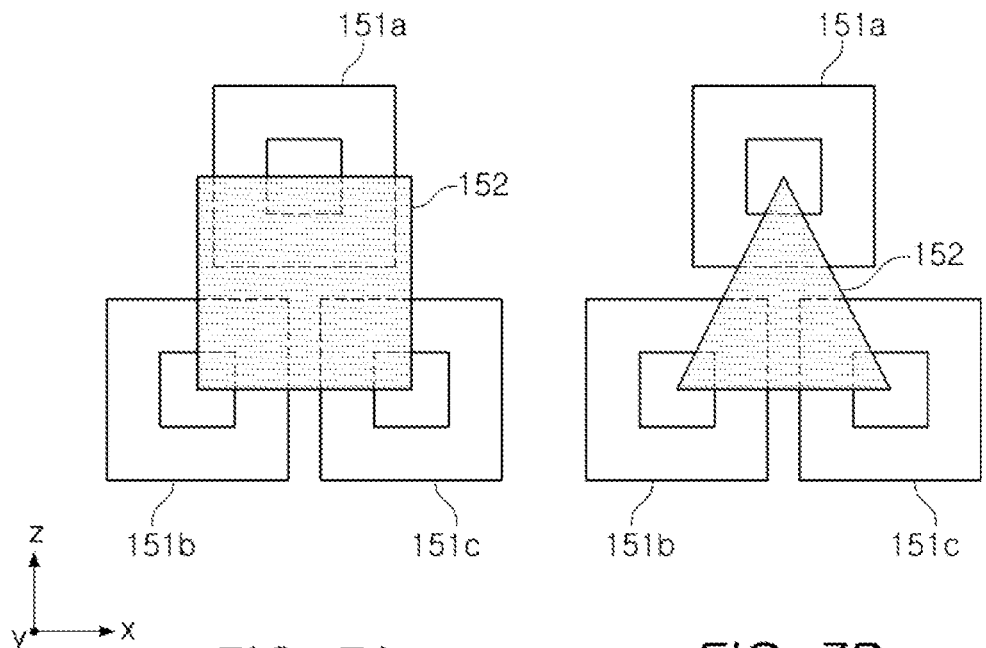
FIGS. 7A and 7B are views illustrating layouts of sensing coils and detection targets according to exemplary embodiments of the disclosure.

FIGS. 7A and 7B are views illustrating a layout of a sensing coil and a detection target according to another exemplary embodiment of the disclosure.

Referring to FIGS. 7A and 7B, a sensing coil 151 may include a first sensing coil 151a, a second sensing coil 151b, and a third sensing coil 151c. The first sensing coil 151a and the second sensing coil 151b may be disposed in the Z-axis direction, and the second sensing coil 151b and the third sensing coil 151c may be disposed in the X-axis direction. A detection target 152 may have a rectangular shape as illustrated in FIG. 7A or may have a triangular shape as illustrated in FIG. 7B depending on a layout of the first sensing coil 151a, the second sensing coil 151b, and the third sensing coil 151c. In addition, a shape of the detection target 152 may be modified into various shapes, in addition to the rectangular shape and to the triangular shape.

The sensing unit 150 may perform subtraction between inductances of the first sensing coil 151a and the second sensing coil 151b disposed in the Z-axis direction to determine a position of the detection target 152 in the Z-axis direction. In addition, the sensing unit 150 may divide a value generated by performing the subtraction between the inductances of the first sensing coil 151a and the second sensing coil 151b by a value generated by performing addition among inductances of the first sensing coil 151a, the second sensing coil 151b, and the third sensing coil 151c to more precisely determine a position of the detection target 152 in the Z-axis direction.

The sensing unit 150 may perform the addition among the inductances of the first sensing coil 151a, the second sensing coil 151b, and the third sensing coil 151c to determine a position of the detection target 152 in the Y-axis direction.

The sensing unit 150 may perform subtraction between inductances of the second sensing coil 151b and the third sensing coil 151c disposed in the X-axis direction to determine a position of the detection target 152 in the X-axis direction. In addition, the sensing unit 150 may divide a value generated by performing the subtraction between the inductances of second sensing coil 151b and the third sensing coil 151c by a value generated by performing the addition among the inductances of the first sensing coil 151a, the second sensing coil 151b, and the third sensing coil 151c to more precisely determine the position of the detection target 152 in the X-axis direction.

Figures 8A, 8B:
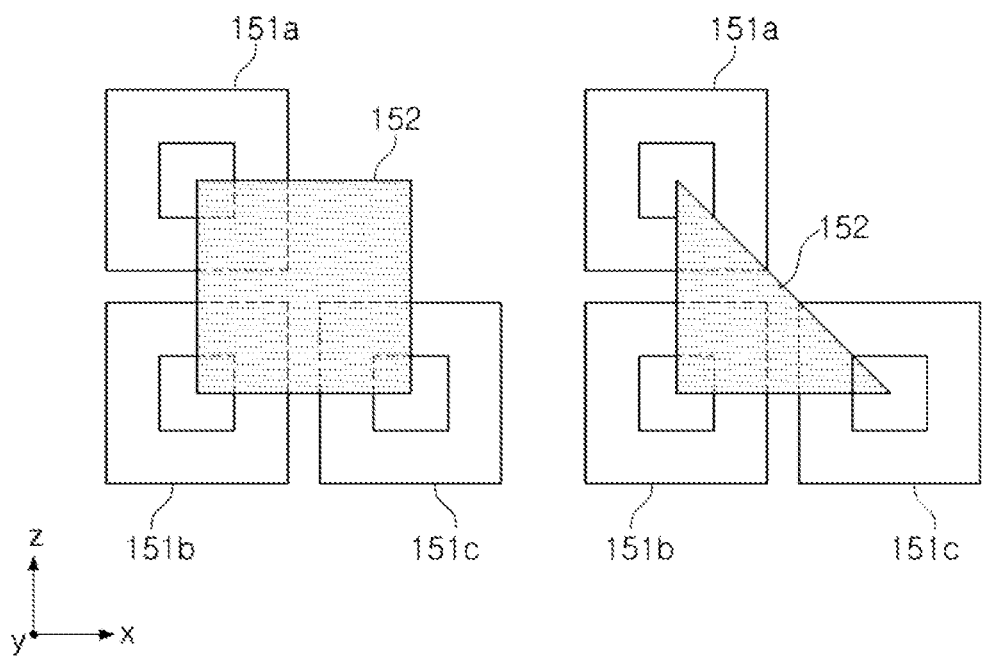
FIGS. 8A and 8B are views illustrating layouts of sensing coils and detection targets according to exemplary embodiments of the disclosure.

FIGS. 8A and 8B are views illustrating a layout of a sensing coil and a detection target according to another exemplary embodiment of the disclosure.

Referring to FIGS. 8A and 8B, a sensing coil 151 may include a first sensing coil 151a, a second sensing coil 151b, and a third sensing coil 151c. The first sensing coil 151a may be disposed in the Z-axis direction together with the second sensing coil 151b and the third sensing coil 151c, and the second sensing coil 151b and the third sensing coil 151c may be disposed in the X-axis direction. A detection target 152 may have a rectangular shape as illustrated in FIG. 8A or may have a triangular shape as illustrated in FIG. 8B depending on a layout of the first sensing coil 151a, the second sensing coil 151b, and the third sensing coil 151c. In addition, a shape of the detection target 152 may be modified into various shapes, in addition to the rectangular shape and the triangular shape.

The sensing unit 150 may subtract inductances of the second sensing coil 151b and the third sensing coil 151c from an inductance of the first sensing coil 151a disposed in the Z-axis direction to determine a position of the detection target 152 in the Z-axis direction. In addition, the sensing unit 150 may divide a value generated by subtracting the inductances of the second sensing coil 151b and the third sensing coil 151c from the inductance of the first sensing coil 151a by a value generated by performing addition among the inductances of the first sensing coil 151a, the second sensing coil 151b, and the third sensing coil 151c to more precisely determine a position of the detection target 152 in the Z-axis direction.

The sensing unit 150 may perform the addition among the inductances of the first sensing coil 151a, the second sensing coil 151b, and the third sensing coil 151c to determine a position of the detection target 152 in the Y-axis direction.

The sensing unit 150 may perform subtraction between inductances of the second sensing coil 151b and the third sensing coil 151c disposed in the X-axis direction to determine a position of the detection target 152 in the X-axis direction. In addition, the sensing unit 150 may divide a value generated by performing the subtraction between the inductances of second sensing coil 151b and the third sensing coil 151c by a value generated by performing the addition among the inductances of the first sensing coil 151a, the second sensing coil 151b, and the third sensing coil 151c to more precisely determine the position of the detection target 152 in the X-axis direction.

An operation of determining the position of the detection target under the assumption that two or three sensing coils are provided has been described hereinabove, but four or more sensing coils may also be provided, and the above-mentioned manner may also be applied to a case in which the four or more sensing coils are provided.

As set forth above, the sensing unit of a camera module according to the exemplary embodiment of the disclosure may precisely detect the position of the detection target from the changes in the inductances of the sensing coils. Further, the sensing unit of a camera module does not use a separate hall sensor, such that a manufacturing cost of the sensing unit of a camera module may be reduced and space efficiency of the sensing unit of a camera module may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensing unit of a camera module, comprising:
a detection target disposed on a side surface of a lens module;
one or more sensing coils disposed to face the detection target; and
a calculator circuit configured to determine a displacement of the detection target translated in one or more of a first direction perpendicular to an optical axis direction dependent on a difference between inductances of the one or more sensing coils, and a second direction perpendicular to the optical axis direction dependent on a combination of inductances of the one or more sensing coils.

2. The sensing unit of claim 1, wherein the inductances of the one or more sensing coils are changed depending on the movement of the detection target.

3. The sensing unit of claim 1, wherein the one or more sensing coils comprise a first sensing coil and a second sensing coil disposed in the first direction.

4. The sensing unit of claim 3, wherein the calculator circuit is further configured to perform subtraction between inductances of the first sensing coil and the second sensing coil to determine the displacement of the detection target in the first direction.

5. The sensing unit of claim 4, wherein the calculator circuit is further configured to perform addition between the inductances of the first sensing coil and the second sensing coil to determine the displacement of the detection target in the second direction.

6. The sensing unit of claim 5, wherein the calculator circuit is further configured to divide a value generated by performing the subtraction by a value generated by performing the addition to determine the displacement of the detection target in the first direction.

7. The sensing unit of claim 3, wherein the one or more sensing coils further comprise a third sensing coil disposed in the optical axis direction together with at least one of the first sensing coil and the second sensing coil.

8. The sensing unit of claim 7, wherein the calculator circuit is further configured to determine a displacement of the detection target in the optical axis direction based on a subtraction between inductances of at least one of the first sensing coil and the second sensing coil and a third inductance of the third sensing coil.

9. The sensing unit of claim 8, wherein the calculator circuit is further configured to determine a displacement of the detection target in the second direction based on addition among the inductances of the first sensing coil, the second sensing coil, and the third sensing coil.

10. The sensing unit of claim 9, wherein the calculator circuit is further configured to determine a displacement of the detection target in the first direction based on a value generated by performing the subtraction divided by a value generated by performing the addition.

11. A camera module comprising:
a lens module comprising an optical axis direction;
an actuator unit circuit configured to provide a driving force in the optical axis direction and a direction perpendicular to the optical axis direction; and
a sensing unit circuit comprising one or more sensing coils disposed to face a side surface of the lens module and configured to determine a displacement of the lens module in one or more of the direction perpendicular to the optical axis direction dependent on a difference between inductances of the one or more sensing coils, and a direction perpendicular to a surface on which the one or more sensing coils are disposed dependent on a combination of the inductances of the one or more sensing coils.

12. The camera module of claim 11, wherein the sensing unit circuit further comprises a detection target disposed on the side surface of the lens module, wherein the inductances of the one or more sensing coils changes as a result of movement of the detection target.

13. The camera module of claim 11, wherein the sensing unit circuit is configured to determine the displacement of the lens module in the direction perpendicular to the optical axis direction based on subtraction between inductances of the one or more sensing coils.

14. The camera module of claim 13, wherein the sensing unit circuit is configured to perform the subtraction between the inductances of the one or more sensing coils to remove changes in the inductances due to the displacement of the lens module in the direction perpendicular to the surface on which the one or more sensing coils are disposed.

15. The camera module of claim 11, wherein the sensing unit circuit is configured to perform addition between inductances of the one or more sensing coils to determine the displacement of the lens module in the direction perpendicular to the surface on which the one or more sensing coils are disposed.

16. The camera module of claim 15, wherein the sensing unit circuit is configured to perform the addition between the inductances of the one or more sensing coils to remove changes in the inductances due to a displacement of the lens module in the direction perpendicular to the optical axis.

17. A sensing unit of a camera module, comprising:
a detection target disposed on a lens module;
sensing coils disposed to face the detection target; and
a calculator circuit,
wherein the calculator circuit is configured to receive an inductance of each of the sensing coils and determine a displacement of the detection target translated in one or more of a first direction perpendicular to the optical axis direction dependent on a difference in the inductances of the sensing coils from one another, and a second direction perpendicular to the optical axis direction different from the first direction dependent on a combination of the inductances of the sensing coils to one another.

18. The sensing unit of claim 17, wherein the sensing coils are disposed in the first direction,
the calculator circuit is further configured to determine one or more of a displacement of the detection target in the first direction by subtracting the inductances of the sensing coils from one another and a displacement of the detection target in the second direction by adding the inductances of the sensing coils to one another, and the second direction is perpendicular to the first direction.

19. The sensing unit of claim 18, wherein the sensing coils are further disposed in the optical axis direction, and the calculator circuit is further configured to determine a displacement of the detection target in the optical axis direction by subtracting the inductances of the sensing coils from one another.

20. The sensing unit of claim 1, wherein the calculator circuit is further configured to determine a displacement of the detection target translated in the optical axis direction.

21. The camera module of claim 11, wherein the sensing unit circuit is further configured to determine a displacement of the lens module in the optical axis direction.

\* \* \* \* \*